(12) United States Patent
Dempsey et al.

(10) Patent No.: US 9,481,456 B2
(45) Date of Patent: Nov. 1, 2016

(54) RELATIVE ACCELERATION BLADE POSITION MEASUREMENT

(71) Applicant: Sikorsky Aircraft Corporation, Stratford, CT (US)

(72) Inventors: Patrick J. Dempsey, New Haven, CT (US); Matthew A. White, Milford, CT (US); Aaron Kellner, Bloomfield, CT (US); Joshua King, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 438 days.

(21) Appl. No.: 14/164,724

(22) Filed: Jan. 27, 2014

(65) Prior Publication Data
US 2015/0210382 A1    Jul. 30, 2015

(51) Int. Cl.
| | |
|---|---|
| *B64C 27/54* | (2006.01) |
| *B64C 11/06* | (2006.01) |
| *B64C 11/30* | (2006.01) |
| *B64C 13/16* | (2006.01) |
| *B64C 27/57* | (2006.01) |
| *B64C 27/78* | (2006.01) |
| *B64C 27/00* | (2006.01) |
| *B64C 27/51* | (2006.01) |
| *B64C 27/80* | (2006.01) |
| *B64C 27/72* | (2006.01) |

(52) U.S. Cl.
CPC .............. *B64C 27/54* (2013.01); *B64C 11/06* (2013.01); *B64C 11/30* (2013.01); *B64C 11/301* (2013.01); *B64C 13/16* (2013.01); *B64C 27/008* (2013.01); *B64C 27/57* (2013.01); *B64C 27/78* (2013.01); *B64C 27/51* (2013.01); *B64C 27/80* (2013.01); *B64C 2027/7255* (2013.01); *Y02T 50/34* (2013.01)

(58) Field of Classification Search
CPC ..... B64C 11/06; B64C 11/30; B64C 11/301; B64C 13/16; B64C 27/008; B64C 27/51; B64C 27/57; B64C 27/78; B64C 27/80
See application file for complete search history.

(56) References Cited

U.S. PATENT DOCUMENTS

| | | | | |
|---|---|---|---|---|
| 2,380,583 | A | * 7/1945 | De La Clerva ....... | B64C 27/025 416/103 |
| 4,053,123 | A | * 10/1977 | Chadwick ............. | B64C 27/008 416/61 |
| 4,519,743 | A | * 5/1985 | Ham ...................... | B64C 27/72 416/1 |
| 4,834,318 | A | 5/1989 | Taylor et al. | |
| 5,728,935 | A | * 3/1998 | Czompo ................. | G01V 7/16 73/382 G |
| 5,865,599 | A | * 2/1999 | Pruden ................... | B64C 11/30 416/61 |
| 5,913,659 | A | * 6/1999 | Doolin .................. | B64C 27/008 416/107 |
| 6,189,836 | B1 | 2/2001 | Gold et al. | |

(Continued)

*Primary Examiner* — Dale W Hilgendorf
(74) *Attorney, Agent, or Firm* — Cantor Colburn LLP

(57) ABSTRACT

Embodiments are directed to obtaining data from a plurality of sensors located on a rotorcraft, wherein a first plurality of the sensors is associated with a hub of the rotorcraft and a second plurality of the sensors is associated with blades of the rotorcraft, processing the data to isolate blade dynamics using the data from the sensors associated with the blade from rotorcraft maneuvering dynamics using the data from the sensors associated with the hub, obtaining at least one parameter associated with the blade dynamics based on the processing, and analyzing the at least one parameter to control at least one of the rotorcraft and the blades.

18 Claims, 6 Drawing Sheets

(56) References Cited

U.S. PATENT DOCUMENTS

| | | | |
|---|---|---|---|
| 6,322,324 B1 * | 11/2001 | Kennedy | B64C 27/001 416/1 |
| 6,422,816 B1 * | 7/2002 | Danielson | B64C 11/301 416/35 |
| 6,453,669 B2 * | 9/2002 | Kennedy et al. | 60/527 |
| 7,085,655 B2 | 8/2006 | Ferrer | |
| 7,363,120 B2 | 4/2008 | Aubourg | |
| 7,448,854 B2 * | 11/2008 | Jolly | B64C 27/001 416/1 |
| 8,812,255 B2 * | 8/2014 | Lynch et al. | 702/89 |
| 2010/0116925 A1 | 5/2010 | Segal | |
| 2013/0092786 A1 | 4/2013 | Kellner | |
| 2014/0061369 A1 * | 3/2014 | Schank | B64C 27/008 244/17.13 |
| 2014/0145025 A1 * | 5/2014 | Fang et al. | 244/17.11 |

* cited by examiner

RELATIVE ACCELERATION BLADE POSITION MEASUREMENT

STATEMENT REGARDING FEDERALLY SPONSORED RESEARCH OR DEVELOPMENT

This invention was made with Government support with the United States Army under Contract No. W911W6-10-2-0004. The Government has certain rights in this invention.

BACKGROUND

On an aircraft, such as a rotorcraft, mechanical stops may be used to prevent blades from contacting one or more objects. For example, mechanical stops may impose a limit such that rotor blades may be precluded from hitting the body or frame of a helicopter.

The rotor information, or state, used by a helicopter diagnostic or flight control system can be measured in real-time and used to augment vehicle flight dynamics, improve disturbance rejection, detect damage, and limit rotor loads. This rotor information can include parameters such as flapping, pitching, and lead-lag accelerations, velocities, positions, and moments. Rotor states are not directly used in current helicopter flight control systems because the harsh rotor operating environment (centrifugal force, rain, dirt, sand, sunlight, vibrations, EMI, etc.), the difficulty providing reliable power and data to and from rotor sensors and the difficulty with fuselage dynamics contaminate sensed rotor state information.

BRIEF SUMMARY

An embodiment is directed to a method applied to a rotorcraft comprising a rotor including blades, the method comprising: obtaining data from a plurality of sensors located on the rotorcraft, wherein a first plurality of the sensors is associated with a hub of the rotorcraft and a second plurality of the sensors is associated with the blades, processing the data to isolate blade dynamics using the data from the sensors associated with the blade from rotorcraft maneuvering dynamics using the data from the sensors associated with the hub, obtaining at least one parameter associated with the blade dynamics based on the processing, and analyzing the at least one parameter to control at least one of the rotorcraft and the blades.

An embodiment is directed to an apparatus for use in a rotorcraft having at least one rotor with blades, the apparatus comprising: at least one processor, and memory having instructions stored thereon that, when executed by the at least one processor, cause the apparatus to: obtain data from a plurality of sensors located on the rotorcraft, wherein a first plurality of the sensors is associated with a hub of the rotorcraft and a second plurality of the sensors is associated with the blades, process the data to isolate blade dynamics from rotorcraft maneuvering dynamics, obtain at least one parameter associated with the blade dynamics based on the processing, and analyze the at least one parameter to control at least one of the rotorcraft and the blades.

An embodiment is directed to an aircraft comprising: an airframe, a hub extending from the airframe and which rotates about an axis, blades extending from the hub which generate lift according to the rotation of the hub, a plurality of hub sensors disposed at the hub which measure motion associated with the hub of the aircraft, a plurality of blade sensors disposed at the blades which measure motion associated with each of a plurality of blades of the aircraft, and a control computer configured to: obtain data from the hub sensors and the blade sensors, process the data to isolate blade dynamics using the data from the blade sensors from aircraft maneuvering dynamics using the data from the hub sensors, obtain at least one parameter associated with the blade dynamics based on the processing, and control the blades using the obtained one parameter.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
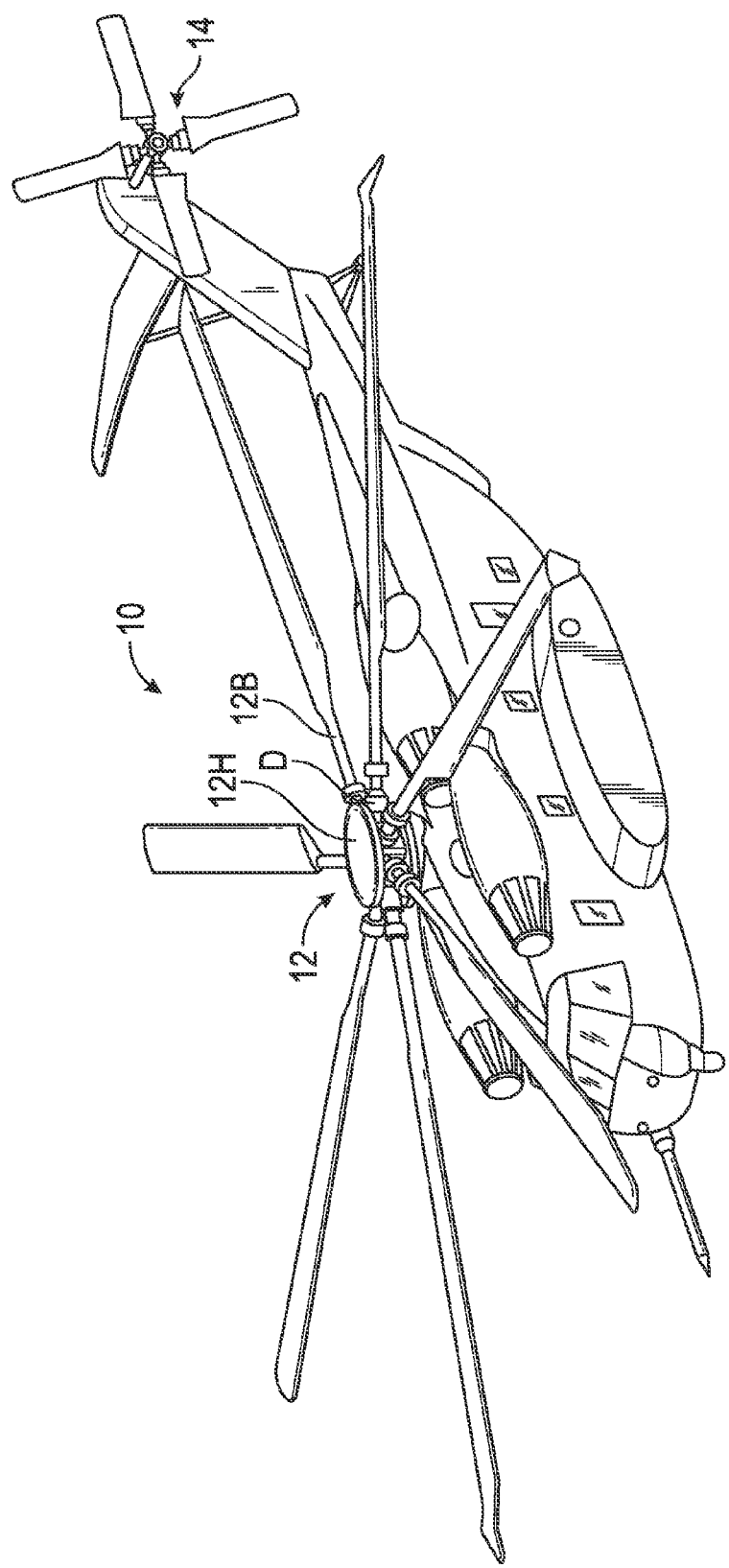
FIG. 1A is a general perspective side of an exemplary rotary wing aircraft.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for determining one or more parameters associated with one or more blades of an aircraft. In some embodiments, a relative acceleration technique may be used to eliminate fuselage motion. In some embodiments, acceleration may be measured at a blade root, which may be used to minimize or eliminate high order effects.

FIG. 1A illustrates a general perspective view of a helicopter embodiment 10 of a rotary wing aircraft for use with aspects of the present. invention. The helicopter includes a main rotor assembly 12 and tail rotor assembly 14, A mechanical lead/lag damper D (illustrated schematically) is mounted between a rotor hub 12H and each rotor blade assembly 12B to react in-plane edgewise motion of each blade assembly 12B to dampen vibration, Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 1B:
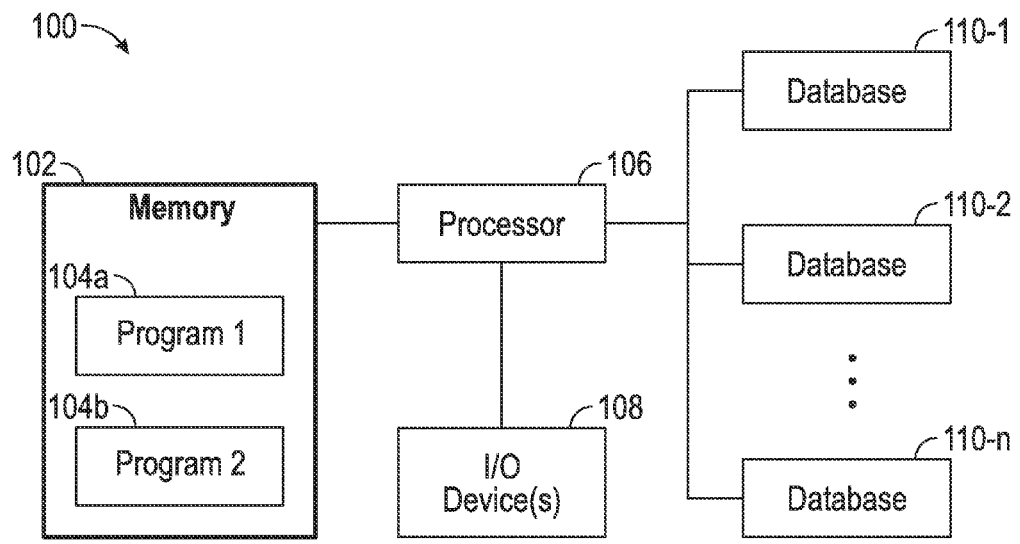
FIG. 1B is a schematic block diagram illustrating an exemplary computing system.

Referring to FIG. 1B, an exemplary computing system 100 is shown. Computing system 100 may be part of a flight control system of the aircraft 10. The system 100 is shown as including a memory 102. The memory 102 may store executable instructions. The executable instructions may be stored or organized in any manner and at any level of abstraction, such as in connection with one or more applications, processes, routines, procedures, methods, etc. As an example, at least a portion of the instructions are shown in FIG. 1B as being associated with a first program 104a and a second program 104b.

The instructions stored in the memory 102 may be executed by one or more processors, such as a processor 106. The processor 106 may be coupled to one or more input/output (I/O) devices 108. In some embodiments, the I/O device(s) 108 may be configured to receive the sensor data from the hub sensors 402 and blade sensors 404 (see, e.g., FIG. 4A). While not required in all aspects, the I/O device(s) 108 may include one or more of a keyboard or keypad, a touchscreen or touch panel, a display screen, a microphone, a speaker, a mouse, a button, a remote control, a control stick, a joystick, a printer, a telephone or mobile device (e.g., a smartphone), etc. so as to also provide an interface to allow a user to interact with the system 100 in addition to the sensor data. Alternately, the user interface could be provided separately.

As shown, the processor 106 may be coupled to a number 'n' of databases, 110-1, 110-2, . . . 110-n. The databases 110 may be used to store data, such as data obtained from one or more sensors (e.g., accelerometers). In some embodiments, the data may pertain to one or more parameters associated with a blade of an aircraft (e.g., aircraft 10).

The system 100 is illustrative. In some embodiments, one or more of the entities may be optional. In some embodiments, additional entities not shown may be included. In some embodiments, the entities may be arranged or organized in a manner different from what is shown in FIG. 1B. For example, in some embodiments, the memory 102 may be coupled to or combined with one or more of the databases 110. While not required in all aspects, the memory 102 can be a magnetic medium, an optical medium or other like computer readable medium.

Figure 2:
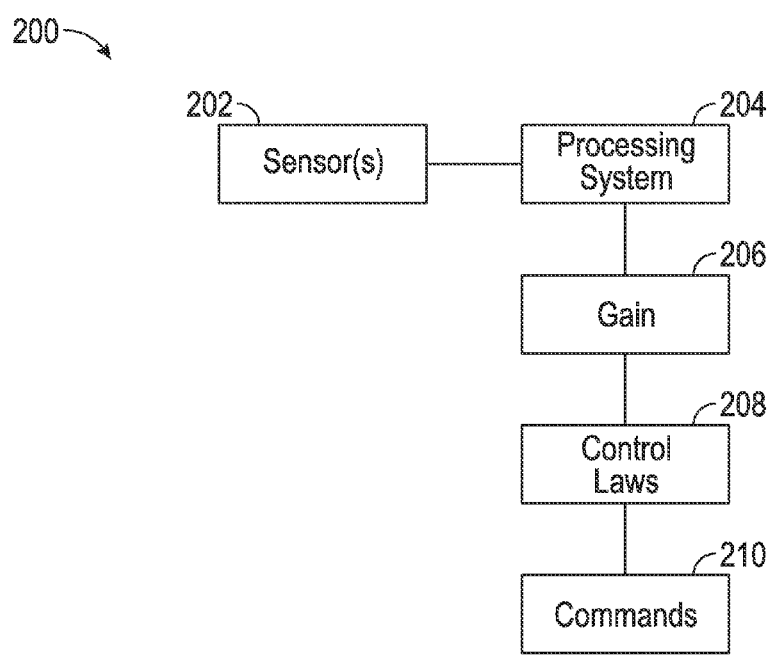
FIG. 2 is a block diagram of an exemplary system environment.

Turning now to FIG. 2, a block diagram of a system 200 in accordance with one or more embodiments is shown. The system 200 may be used to obtain one or more parameters associated with blade operation or motion. Blade or rotor motion may be used, potentially as a feedback mechanism, for purposes of flight controls.

The system 200 may include one or more sensors 202. The sensors 202 may include accelerometers, such as gravimetric accelerometers. One or more sensors 202 may be located on, or associated with, a hub arm 12H and a blade 12B (see, e.g., FIG. 4C). The sensors 202 may be configured to obtain data in connection with the axial, radial, and tangential directions associated with, e.g., the rotor system 12. While not required in all aspects, the sensors 202 include sensors 402 on the hub arm 12H, and other sensors 404 on the root of the blade 12B. Measurement at the root includes minimal high order blade bending and torsional detection. Where these measurements are intended for flight control feedback use, it is desirable to measure the first order blade movement, so the root measurement is thought to be the most effective location. The sensors 202 are also mounted as sensors 402 on the hub-arm 12H and as other sensors 404 on the inboard portion of the blade 12B. Because the hub-arm 12H will have minimal flapping and lead-lag deflection (only root bending, which is relatively small), the hub-arm 12H mounted accelerometers provide a steady reference point for comparison with the blade measurements. However, it is understood that other locations could be utilized.

The data provided by the sensors 202 may pertain to one or more angles, velocities, accelerations, positions, or any other parameter. The data may be processed in connection with a processing system 204, such as a rotating frame processing system. The processing system 204 may include one or more components or devices, such as those described above in connection with FIG. 1B. In some embodiments, the processing system 204 may be implemented as a processing unit on a rotor head. In some embodiments, the processing system 204 may be implemented in connection with a slip ring.

The processing system 204 (or one or more additional or alternative entities) may transform the data from a rotating frame to a fixed frame. Based on the transformation, one or more states associated with the operation of the aircraft may be obtained. For example, one or more states associated with the coning angle, the longitudinal tilt of the tip path plane (TPP), and the latitudinal tilt of the TPP may be obtained.

In some embodiments, as part of the processing in connection with the processing system 204, one or more gains may be applied as shown in block 206.

Based on the processing performed by the processing system 204, one or more control laws may be defined in block 208. For example, the control laws 208 may be defined to provide one or more metrics or requirements. Such requirements may include minimizing hub moments, maximizing aircraft maneuverability, maximizing gust rejection, and maintaining or maximizing stability margins.

The control laws 208 may, in turn, drive one or more commands 210 (e.g., servo commands). For example, control of a swashplate, an actuator, and individual blade control may be provided via the commands 210.

In some embodiments, blade motion parameters may be used for scheduling maintenance operations. For example, data regarding blade motion may be analyzed to determine if a blade is approaching a mechanical or theoretical limit If the blade is approaching such a limit, a maintenance or service activity may be scheduled.

Figure 3:
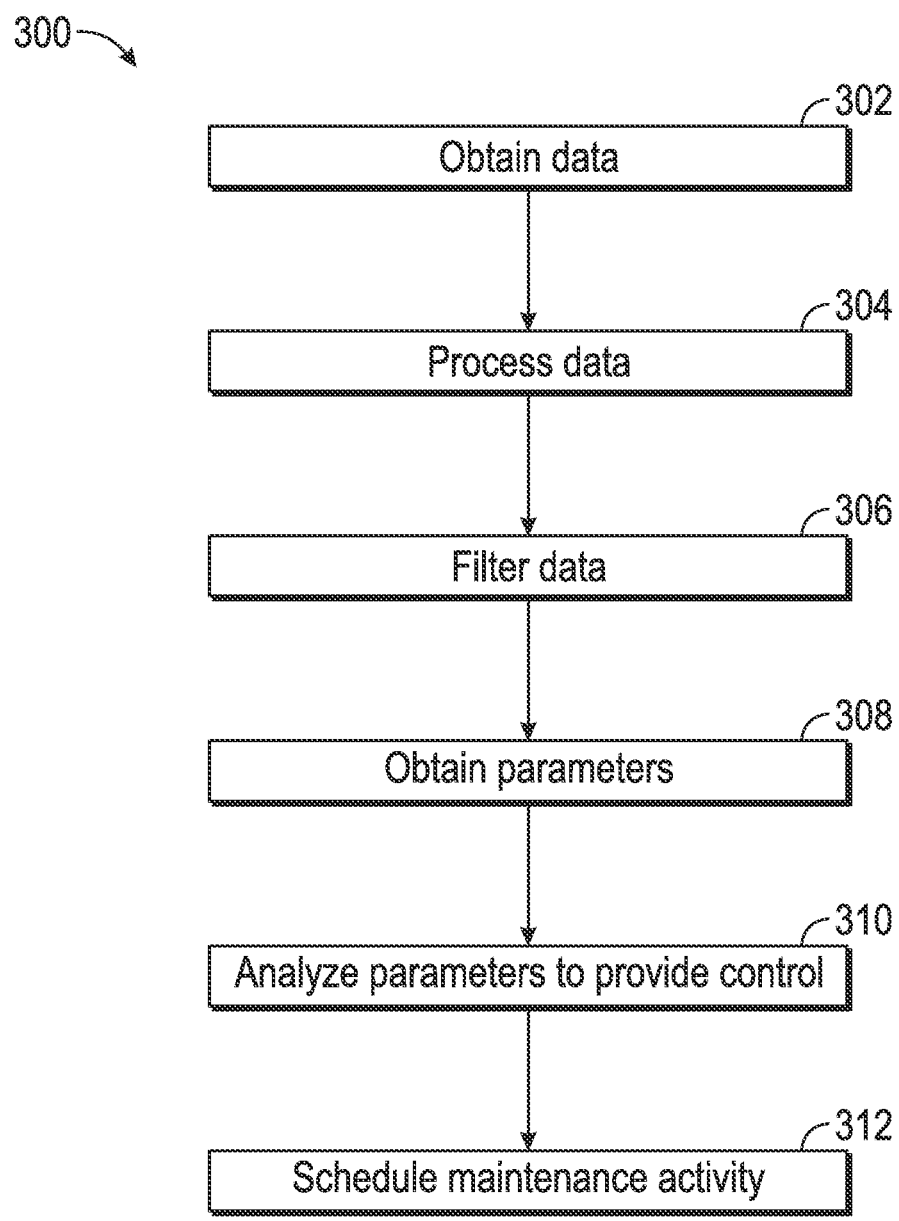
FIG. 3 illustrates a flow chart of an exemplary method.

Turning now to FIG. 3, a flow chart of an exemplary method 300 is shown. The method 300 may be executed by one or more systems, components, or devices, such as those described herein (e.g., the system 100 and/or the system 200). The method 300 may be used to robustly and accurately obtain one or more parameters associated with the motion of a blade of an aircraft.

In block 302, data associated with the operation of the aircraft may be obtained from one or more sensors (e.g., sensors 202). The data may pertain to the movements or positions of one or more blades of the aircraft.

In block 304, the data of block 302 may be processed. For example, the data may be processed by the processing system 204 of FIG. 2.

In block 306, the processed data of block 304 may be filtered. The filtering may be done to remove extraneous data, to reduce the impact of noise on one or more measurements, or to obtain a data profile that more closely mirrors or resembles the physical world.

In block 308, one or more parameters associated with the blades may be derived or obtained. Such parameters may be obtained based on an integration of the filtered data of block 306.

In block 310, the parameters of block 308 may be analyzed to control or regulate the operation of the blades or the aircraft. For example, the parameters may be applied in connection with a blade frame or a vehicle frame.

In block 312, one or more maintenance activities may be scheduled. For example, if the data (blocks 304 and 306) or parameters (block 308) indicate that the operation of a blade is causing the blade to approach a mechanical stop or limit within a threshold, a maintenance activity may be scheduled to obtain a greater degree of margin from the threshold.

Figure 4A:
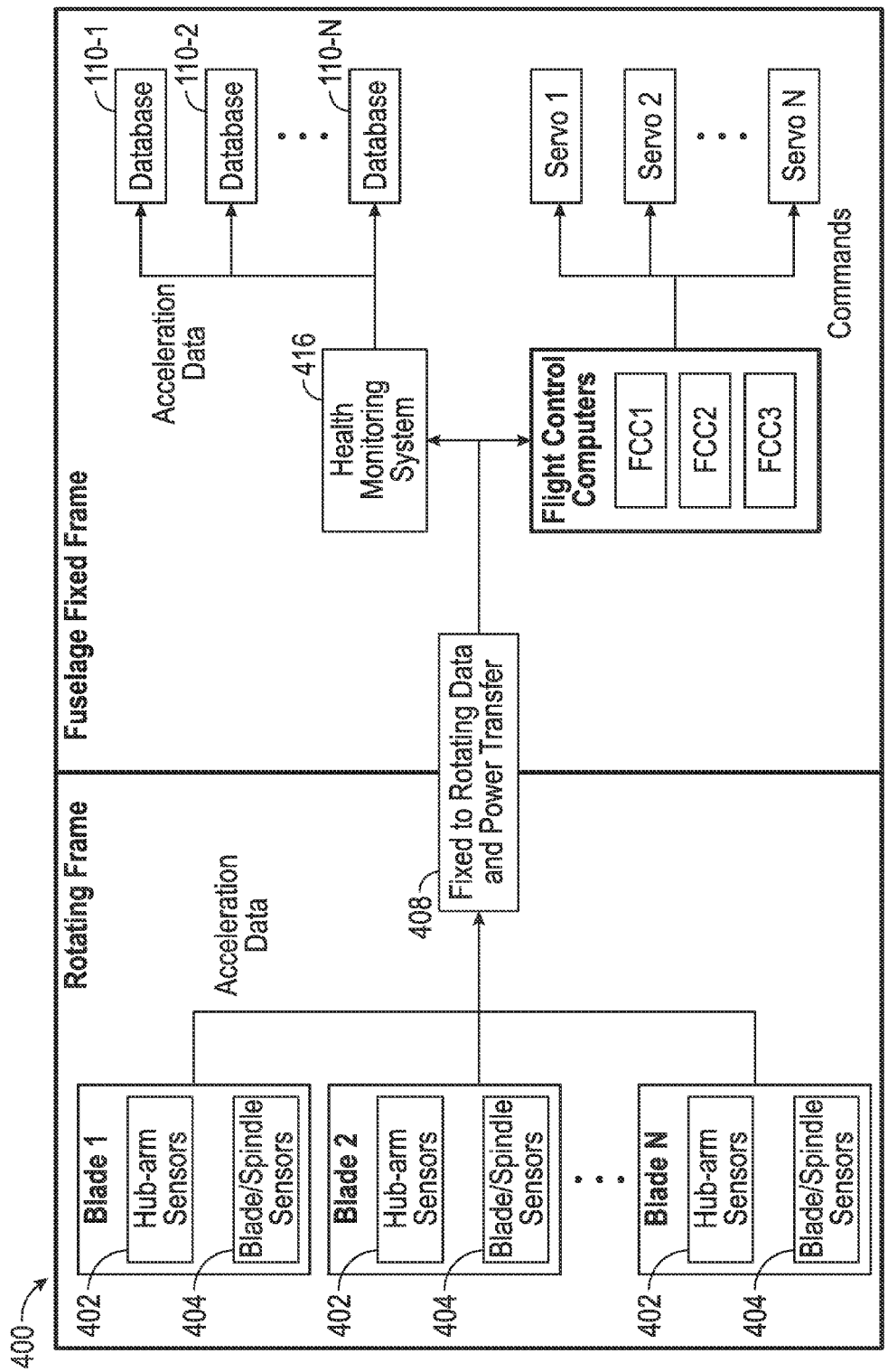
FIGS. 4A-4C illustrates block diagrams of exemplary system environments.
Figure 4B:
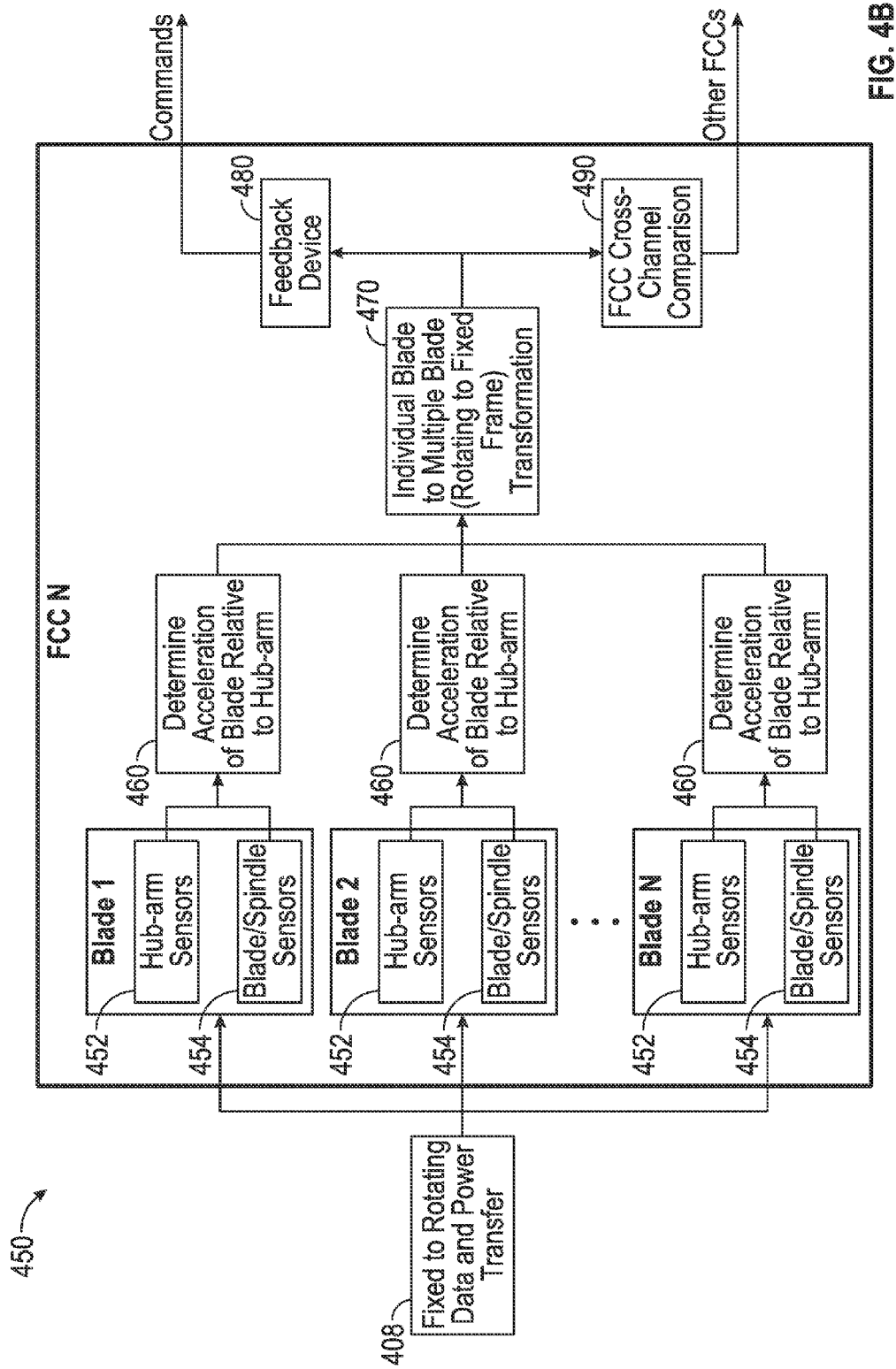
Figure 4C:
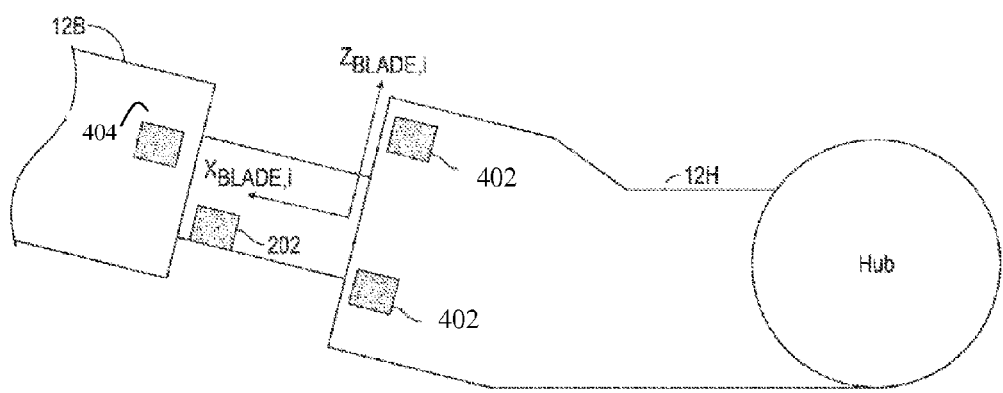

Turning to FIGS. 4A-4B, system environments 400 and 450 in connection with one or more embodiments are shown, and FIG. 4C shows, for a single blade 12B, the location of the sensors 402 on the hub 12H and the sensors 404 on the root end of the blade 12B. One or both of the systems 400 and 450 may be implemented in connection with one or more components, devices, or other systems, such as those described herein (e.g., the systems 100 and 200).

As represented in FIG. 4A, an aircraft (e.g., aircraft 10) may have a count 'N' of blades (denoted as blade 1, blade 2, ... blade N). Each of the 'N' blades may be associated with, or include, one or more hub-arm sensors 402 and blade/spindle sensors 404. The sensors 402, 404 may include accelerometers, such that the sensors may output or provide data pertaining to acceleration. The data may include one or more identifiers or tags in order to associate a given portion of the data with a particular sensor or blade.

The acceleration data may be provided to a device 408 that may be used to transfer the data and/or power. The device 408 may be used to transition from a rotating frame to a fuselage fixed frame. In some embodiments, the device 408 may include a slip ring.

The output of the device 408 may be provided on a bus to one or more flight control computers (denoted as FCC1, FCC2, FCC3) and/or a health monitoring system 416.

The health monitoring system 416 may be coupled to one or more databases, such as the databases 110. The acceleration data, potentially subject to one or more transformations or processing, may be stored in the databases 110. The acceleration data may be analyzed by the health monitoring system 416 in order to provide status regarding aircraft state or health. For example, the state or health regarding one or more of the blades may be determined by the health monitoring system 416.

The flight control computers FCC1 through FCC3 may manipulate or process the acceleration data to generate commands to be utilized by one or more flight control systems. In this respect, the commands may be provided to one or more servos (denoted as servo 1, servo 2, ... servo N). The servos may be fixed frame and/or on-blade rotating frame servos.

Referring to FIG. 4B, additional details regarding the operation of one or more of the flight control computers in accordance with one or more embodiments is shown. The data obtained from the device 408 may be analyzed for each of the blades. In this respect, the data 452 and 454 may correspond to the data obtained from the hub-arm sensors 402 and the blade/spindle sensors 404, respectively, for each of the blades.

The data 452, 454 for each of the blades may be processed by devices 460 to determine the acceleration of the blade relative to a hub-arm. A device 470 may perform further processing to transform from an individual blade to multiple blades, or from a rotating frame to a fixed frame.

The output of the device 470 may be provided to one or more feedback devices 480. The feedback device 480 may implement one or more filters and/or gains/amplifiers to generate one or more commands (e.g., servo commands). The commands output by the feedback device 480 may be used to adjust or modify the state of one or more aircraft components or devices, such as one or more of the blades, potentially in response to dynamic conditions (e.g., gusts of wind).

The output of the device 470 may be provided to a FCC cross-channel comparison device 490. The device 490 may be used to output the results of the processing performed by the devices 460 and/or 470 to other flight control computers. The sharing of such results or data may be used for purposes of redundancy or safety, or to guard against a failure of a given flight control computer.

As described herein, by measuring the acceleration of the hub and the blade, it is possible to isolate the blade dynamics from the rest of the aircraft maneuvering dynamics.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method applied to a rotorcraft comprising a rotor including blades, the method comprising:
   obtaining data from a first plurality of hub sensors disposed on a hub of the rotorcraft;
   obtaining data from a second plurality of blade sensors disposed on each of the blades;
   processing the data to isolate blade dynamics from rotorcraft maneuvering dynamics using relative blade-hub acceleration based on the data obtained from the hub and blade sensors;
   obtaining at least one parameter associated with the blade dynamics based on the processing; and
   analyzing the at least one parameter to control at least one of the rotorcraft and the blades.

2. The method of claim 1, wherein the hub and blade sensors comprise accelerometers.

3. The method of claim 1, further comprising:
   measuring acceleration from the blade sensors at a root of each of the blades to minimize high order effects.

4. The method of claim 1, further comprising:
   filtering the processed data prior to obtaining the at least one parameter.

5. The method of claim 1, further comprising:
   controlling, in accordance with the at least one parameter, at least one of: a swashplate, an actuator, an individual blade, or combinations thereof.

6. The method of claim 1, wherein the processing of the data comprises transforming the data from a rotating frame to a fixed frame.

7. The method of claim 1, further comprising:
scheduling a maintenance activity when at least one of the data and the at least one parameter indicate that operation of at least one of the blades is within a threshold of a mechanical stop or a limit.

8. An apparatus for use in a rotorcraft having at least one rotor with blades, the apparatus comprising:
at least one processor; and
memory having instructions stored thereon that, when executed by the at least one processor, cause the apparatus to:
obtain data from a first plurality of hub sensors disposed on a hub of the rotorcraft;
obtain data from a second plurality of blade sensors disposed on each of the blades;
process the data to isolate blade dynamics from rotorcraft maneuvering dynamics using relative blade-hub acceleration based on the data obtained from the hub and blade sensors;
obtain at least one parameter associated with the blade dynamics based on the processing; and
analyze the at least one parameter to control at least one of the rotorcraft and the blades.

9. The apparatus of claim 8, wherein the hub and blade sensors comprise gravimetric accelerometers.

10. The apparatus of claim 8, wherein the instructions, when executed by the at least one processor, cause the apparatus to:
measure acceleration at a root of the blades to minimize high order effects.

11. The apparatus of claim 8, wherein the instructions, when executed by the at least one processor, cause the apparatus to:
filter the processed data prior to obtaining the at least one parameter.

12. The apparatus of claim 8, wherein the at least one parameter is analyzed to control at least one of: a swashplate, an actuator, and an individual blade.

13. The apparatus of claim 8, wherein the instructions, when executed by the at least one processor, cause the apparatus to:
transform the data from a rotating frame to a fixed frame.

14. The apparatus of claim 13, wherein the instructions, when executed by the at least one processor, cause the apparatus to:
obtaining a coning angle, a longitudinal tilt of a tip path plane (TPP), and a latitudinal tilt of the TPP based on the transformation of the data.

15. The apparatus of claim 8, wherein the instructions, when executed by the at least one processor, cause the apparatus to:
schedule a maintenance activity when at least one of the data and the at least one parameter indicate that operation of at least one of the blades is within a threshold of a mechanical stop or a theoretical limit.

16. An aircraft comprising:
an airframe;
a hub extending from the airframe and including hub arms, the hub being rotatable about an axis;
blades respectively extending from each of the hub arms, the blade being configured to generate lift according to the rotation of the hub;
hub arm sensors respectively disposed at each of the hub arms to measure motion associated with the hub;
blade sensors respectively disposed as multiple blade sensors at roots of each of the blades to measure motion associated with each of the blades; and
a control computer configured to:
obtain data from the hub sensors and the blade sensors;
process the data to isolate blade dynamics from aircraft maneuvering dynamics using relative blade-hub acceleration based on the data obtained from the hub arm sensors and the multiple blade sensors for each of the blades;
obtain at least one parameter associated with the blade dynamics for each of the blades based on the processing; and
control each of the blades using the obtained one parameter.

17. The aircraft of claim 16, wherein the control computer utilizes control laws to provide at least one requirement selected from: minimizing hub moments, maximizing aircraft maneuverability, maximizing gust rejection, and maintaining or maximizing stability margins, and
wherein the blades are controlled in accordance with the control laws and the obtained one parameter.

18. The aircraft of claim 16, wherein the at least one parameter pertains to at least one of angles, velocities, accelerations, and positions associated with the blades.

* * * * *